United States Patent [19]
Marandet et al.

[11] 4,430,966
[45] Feb. 14, 1984

[54] HEAT REGULATION CIRCUITS FOR VEHICLES EQUIPPED WITH AN ELECTRIC RETARDER

[75] Inventors: André Marandet, Saint Gratien; Jean-Claude Sertori, Taverny, both of France

[73] Assignee: Labavia - S.G.E., Bois-d'Arcy, France

[21] Appl. No.: 356,033

[22] Filed: Mar. 8, 1982

[30] Foreign Application Priority Data

Mar. 24, 1981 [FR] France .................................. 81 05885

[51] Int. Cl.³ .............................................. F01P 3/12
[52] U.S. Cl. .................................. 123/41.1; 123/41.31; 123/41.44
[58] Field of Search ............... 123/41.31, 41.08, 41.09, 123/41.1, 41.44, 142.5 R

[56] References Cited

U.S. PATENT DOCUMENTS

| | | | |
|---|---|---|---|
| 2,446,995 | 8/1948 | Bay | 123/41.08 |
| 2,541,227 | 2/1951 | Findley | 123/41.31 X |
| 3,190,272 | 6/1965 | Falk | 123/41.09 |
| 3,851,629 | 12/1974 | Mayer et al. | 123/41.08 |

*Primary Examiner*—William A. Cuchlinski, Jr.
*Attorney, Agent, or Firm*—Parmelee, Bollinger and Bramblett

[57] ABSTRACT

A circuit is provided for thermally regulating a vehicle equipped with an electric retarder (2), using the forced circulation of a liquid successively through the engine (1,5) of the vehicle, a radiator (7) and a drive pump (6). An auxiliary circuit section (10) is provided comprising a heat exchanger (11) adapted to remove heat coming from the retarder or to yield up heat to the air current thrown back by the rotor of this retarder and a three-way electro-magnetic valve (12) adapted to bring this section (10) into circuit depending on whether the retarder is energized or not and/or whether the temperature of the liquid in the radiator exceeds a certain threshold or not. A second auxiliary circuit section (15-17) allows the passenger space of the vehicle to be heated.

10 Claims, 6 Drawing Figures

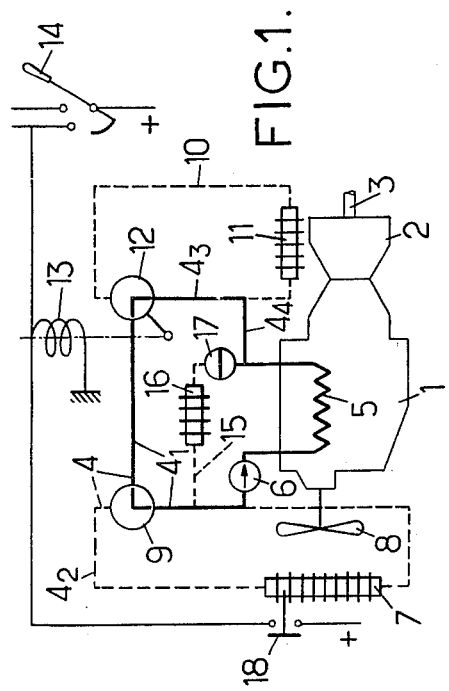
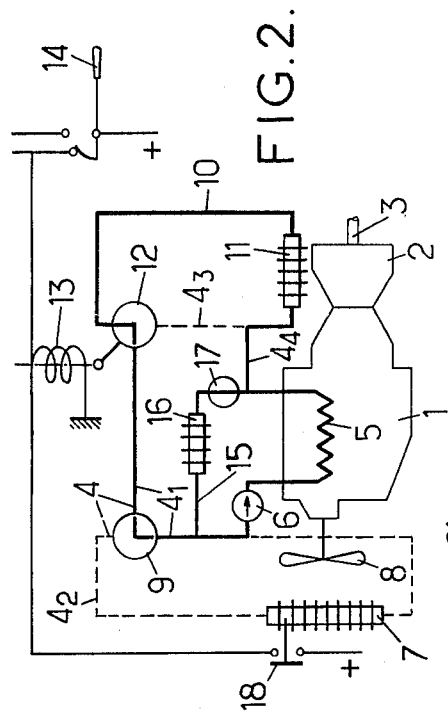
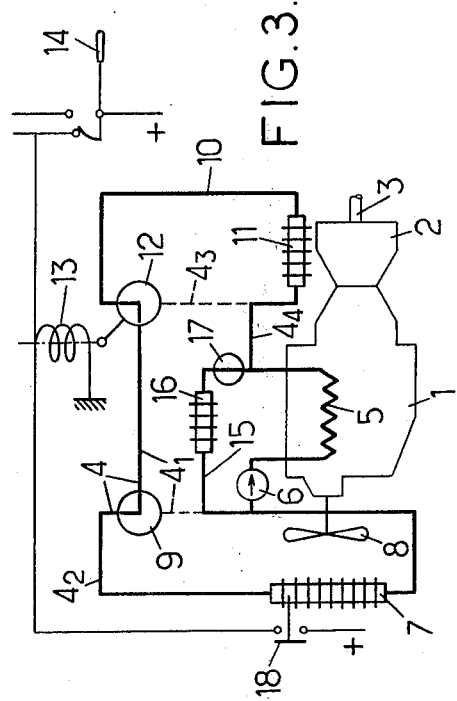
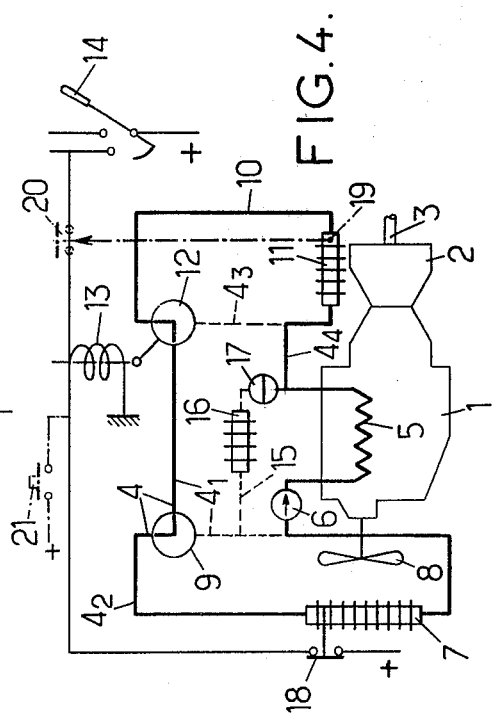

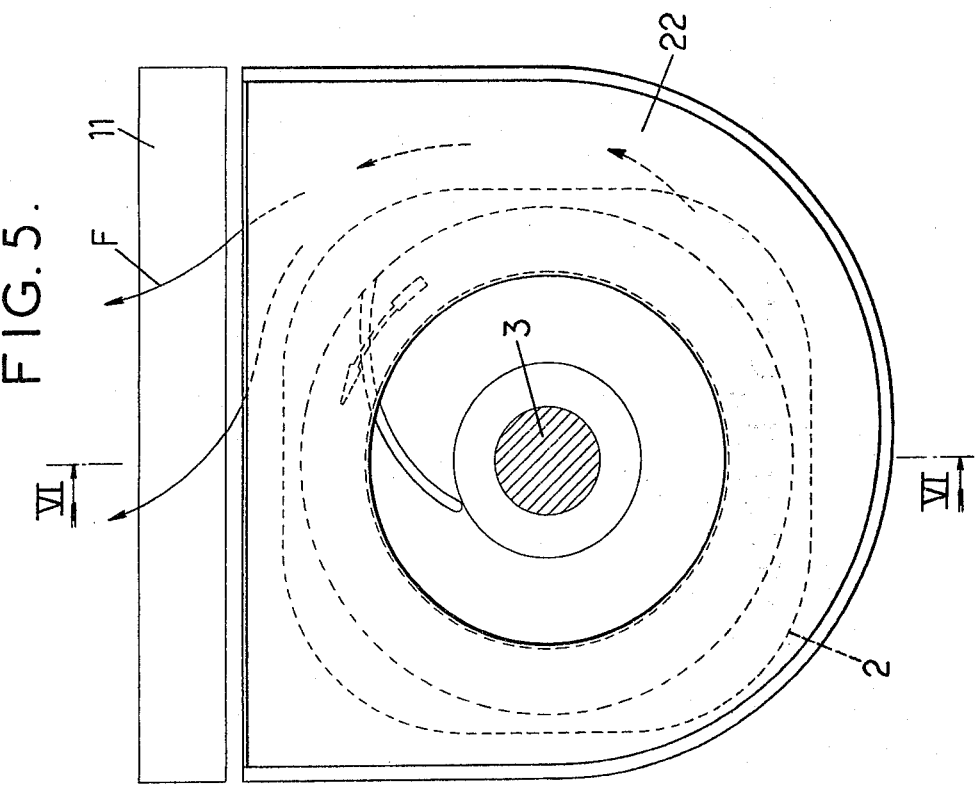
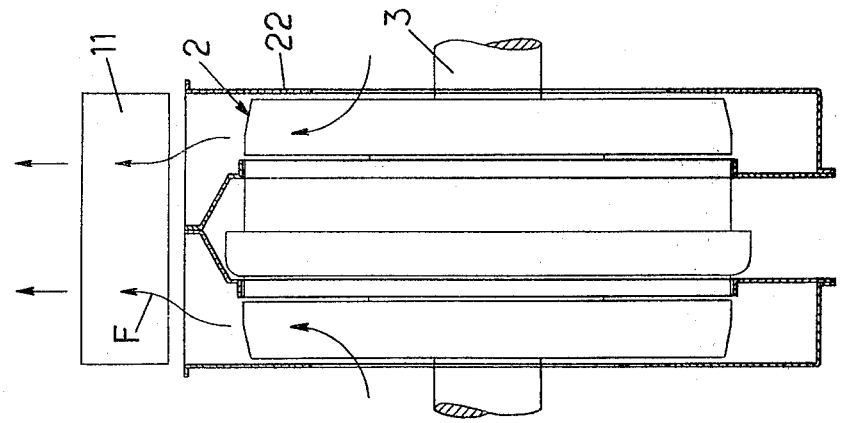

HEAT REGULATION CIRCUITS FOR VEHICLES EQUIPPED WITH AN ELECTRIC RETARDER

The invention relates to vehicles comprising an internal combustion engine, a closed circuit for thermally regulating this engine by the forced circulation of a liquid successively through the engine, through a radiator for cooling this engine and through a driving pump, and an electric eddy-current retarder.

In known embodiments of the vehicles of the kind in question, the heat generated by the retarder during operation thereof is discharged outside the vehicle and cooling fins are provided on the rotor of this retarder forming a fan for promoting such discharge.

This formula presents two consequences:
 a. the heat discharged is lost,
 b. driving the fan requires a certain amount of energy, which is not usefully used when the retarder is cold.

The invention has more especially as its aim to improve the heat regulation circuits considered by recovering the energy which is uselessly consumed at least in the first one of the two ways mentioned above.

To this end, the heat regulation circuits of the invention are essentially characterized in that they comprise, mounted in parallel across one of their constituent pipe elements, a circuit section adapted to have passing therethrough the above liquid current, this section comprising exclusively, in addition to the necessary connections, a heat exchanger thermally associated with the retarder so that said liquid current recovers some of the heat generated by energization of the retarder, and a three-way valve disposed at one of the two mounting points of the section on the pipe element and arranged so as to cause the liquid flowing in the rest of the circuit to follow this section or this pipe element.

In preferred embodiments, recourse is further had to one and/or the other of the following arrangements:
 a. the heat exchanger is thermally associated with the retarder so that the liquid current which flows therethrough is cooled by the ventilation caused by the rotor of the retarder, outside the energization periods of this latter,
 b. the heat exchanger according to the preceding paragraph is formed by a hollow metal body through the inside of which flows the liquid current and the outside of which is swept by the air thrown back by the fan connected with the rotor of the retarder,
 c. the hollow metal body according to the preceding paragraph is mounted across the outlet of a casing surrounding the retarder,
 d. the heat exchanger is formed by the stator of the retarder, bored so as to allow therethrough the liquid current flow,
 e. the three-way valve is an electromagnetic valve, the control of which is slaved to the energization of the retarder so that the liquid current flows in the section when the retarder is energized and so that this current flows on the contrary in the pipe element, except in certain cases, when the retarder is de-energized,
 f. the regulation circuit further comprises a second auxiliary circuit section adapted to have passing therethrough a portion of the above liquid current and mounted in parallel across the portion of said circuit comprising the engine and the pump, said second section comprising a second heat exchanger adapted so as to transfer the heat from this liquid to the passenger space of the vehicle, and a stop cock mounted in this second section,
 g. control of the electromagnetic valve is provided by a thermocontact responsive to the temperature of the liquid in circulation, particularly at the level of the radiator, so that this liquid flows in the first section when said temperature exceeds a threshold T irrespective of whether the retarder is energized or not,
 h. in a circuit according to the preceding paragraph, the heat discharge power due to the combined effects of the radiator and of the fan which serves for cooling it is smaller, all other things being equal, than for a vehicle not comprising such a circuit,
 i. means are provided for preventing the valve from being placed in its position corresponding to the bringing into circuit of the first section as long as the temperature of the liquid in the heat exchanger remains less than a given threshold.

The invention comprises, apart from these main arrangements, certain other arrangements which are preferably used at the same time and which will be more explicitly discussed hereafter.

In what follows, preferred embodiments of the invention will be described with reference to the accompanying drawings in a way which is of course in no wise limiting.

FIGS. 1 to 4 of these drawings show schematically a vehicle heat regulation circuit constructed in accordance with the invention in respectively four separate operating states.

FIGS. 5 and 6 show schematically respectively in a side view and in a section along VI—VI of FIG. 5, an embodiment of the retarder of this vehicle and of the heat exchanger which is associated therewith.

In a way known per se, the vehicle considered comprises:
 a. an internal combustion engine 1,
 b. an eddy current retarder 2 assumed here to be mounted on the drive shaft 3, just at the output of the gear box, and
 c. a closed circuit 4 for cooling the engine by circulation of a liquid (generally water to which antifreeze may be added or not), this circuit comprising in series a section 5 interior to the engine, drive pump 6 and a radiator 7.

The radiator 7 is cooled by an airflow which passes therethrough and which is emitted by a fan 8 driven by the engine: this drive is preferably automatically declutched in any desirable way, generally electrically, as long as the temperature of the liquid in said radiator 7 remains below a threshold T which is for example of the order of 85° C.

In a way also known per se, and although it is not indispensable, a valve 9 controlled by a thermostat (not shown) responsive to the temperature of the liquid leaving the section 5 interior to the engine allows the loop $4_1$ to be closed automatically on itself, this loop comprising said section and pump 6 when this temperature is less than a given threshold t which is for example of the order of 80° C., and on the contrary to bring the complementary loop $4_2$ comprising radiator 7 into circuit for temperatures higher than t.

There is further provided, in accordance with the invention:

a. an auxiliary circuit section 10 comprising exclusively, in addition to the required connections, a heat exchanger 11 (to which we will come back further on) mounted in parallel across a simple pipe element 4₃ forming part of the above loop 4₁, and
b. a three-way electromagnetic valve 12 disposed at one of the connection points of section 10 with element 4₃ for causing at will, depending on its position, the liquid driven by pump 6 to flow either in this element 4₃ or in this section 10.

The heat exchanger 11 is adapted so as to provide heat transfer in one direction or in the other between the liquid flowing in section 10 and retarder 2.

Thus, this exchanger 11 is more especially provided so as to be able to transfer to said liquid a considerable part of the heat generated by operation of the retarder 2, and this more especially for recovering it as will be described more fully further on.

This exchanger may to this end be formed by the stator itself of the retarder, whose carcase and coils are then bored to form channels for circulation of the liquid.

According to other embodiments, exchanger 11 in question is constructed not only with a view to recovering the heat generated by the retarder during operation, but also to use in the reverse direction the cooling effect due to the ventilation generated by the fins of the rotor of this retarder when it is cold.

For using this cooling effect, exchanger 11 is advantageously formed by a metal body having a large area over one of the faces of which the flowing liquid passes and over the other face of which passes the air thrown back by the rotor of the retarder.

It is more especially in the form of a double metal wall inside which flows the liquid in question, this double wall being bored to form multiple passages through which the above air current passes.

The bored body 11 in question may be mounted across the outlet of a spiral casing or cover 22 (FIGS. 5 and 6) which surrounds the retarder 2 so as to guide towards this outlet the whole of the volume of air thrown back by the rotor. A part at least of this casing 22 may also form part of exchanger 11.

The energization of the winding 13 of the electromagnetic valve 12 is controlled by that of one of the stages of the retarder (generally the first one, but possibly another depending on the circumstances), this latter energization being itself controlled by a control lever 14 or other control member such as a pedal: this control is provided so that, as long as the retarder remains deenergized, the flow of liquid driven by pump 6 follows circuit element 4₃ (case of FIGS. 1 and 4) and that on the contrary this flow follows section 10 as soon as the stage concerned of the retarder is energized (FIGS. 2 and 3).

There is further provided:
a. a second auxiliary circuit section 15, known per se, for heating the passenger space of the vehicle and comprising to this end at least one heat convector 16 disposed in this passenger space, which section is mounted in parallel across the portion of loop 4₁ which comprises the internal portion 5 of the engine and pump 6, this second section being equipped with a stop cock 17 generally manually controlled, and
b. a thermocontact 18 responsive to the temperature of the liquid in radiator 7 and capable of controlling, like lever 14, the energization of winding 13 when this temperature exceeds the threshold T and possible in addition the coupling in of fan 8.

The operation of the above installation is the following.

For the starting or rest situation illustrated in FIG. 1,
a. engine 1 is cold, which corresponds to the position of valve 9 in which radiator 7 is out of circuit and to the uncoupled position of fan 8,
b. retarder 2 is not energized, which corresponds to the deenergized position of the electromagnetic valve 12,
c. heating of the passenger space is not connected, which corresponds to closure of stop-cock 17.

If, under these conditions, the engine 1 is started up, the liquid driven by pump 6 follows the shortest possible circuit, formed by loop 4₁: the only members through which this liquid passes are then the internal section 5 of the engine and pump 6.

When, from this situation, the temperature of the water flowing in said loop 4₁ reaches the threshold t, for example of the order of 80° C., valve 9 is, in a way known per se, automatically actuated and switches over to its position shown in FIGS. 3 and 4, in which radiator 7 is switched into circuit and so contributes to removing heat from the engine.

If, from the initial situation illustrated in FIG. 1 corresponding to the cold engine, the retarder is energized, electromagnetic valve 12 is energized at the same time, which brings into circuit section 10 comprising the exchanger 11 (FIG. 2).

The heat generated by the retarder is then transferred to a great extent to the liquid flowing through exchanger 11.

The heat thus recovered may then be used:
a. for increasing more rapidly the rise in temperature of engine 1 as long it is relatively cold, and/or
b. heating the passenger space of the vehicle when stop-cock 17 is open, as was illustrated in FIG. 2.

It should be noted that the opening of stop-cock 17 is effected entirely independently of the positions of valves 9 and 12, i.e. independently of the temperature reigning in the flowing liquid and whether the retarder is energized or not: it is solely by way of illustration and in wise limiting that this open position of stop-cock 17 has been shown in FIGS. 2 and 3 and not in FIGS. 1 and 4.

For said open position of stop-cock 17, only a part of the liquid driven by pump 6 flows in the second section 15, for this second section remains constantly mounted in parallel across another portion of regulation circuit 4, which portion may comprise one at least of exchangers 7 and 11 or not.

The heating of the passenger space follows automatically from the opening of stop-cock 17 as soon as the water in circulation becomes sufficiently hot.

The above described arrangement allows heat dissipated by the retarder to be recovered for heating the passenger space and so correspondingly reducing the external thermal power required for this heating, or even sometimes making pointless any external heat supply.

This recovery is particularly advantageous in the case where the passenger space to be heated is that, of a relatively larger volume,
a. of a town bus subject to frequent slow running and the heating of which in winter gives rise to special problems because of the repeated opening of its access doors, or b. of a coach, particularly when the ambient temperature is relatively low, and with the engine itself relatively cold, as may happen more especially when such a coach follows in winter time a long downhill run in the mountains.

When, from the situation shown schematically in FIG. 2, engine 1 becomes sufficiently hot, valve 9 is actuated automatically, as was explained above, which brings into service radiator 7 as can be seen in FIG. 3.

The operating mode shown schematically in this FIG. 3 is more generally that which is observed for any energization of the retarder occurring when the engine is hot.

On this assumption, radiator 7 is used for removing not only heat generated by the engine (and collected at 5) but also that generated by the retarder (and collected at 11): there is no point in increasing for this purpose the normal heat exchange capacity of this radiator 7 since, when the retarder is energized, the engine is running off-load and so heats up relatively little.

FIG. 4 concerns a particular case in which the above described installation is used not for transferring heat from the retarder to the heat regulation circuit, but in the opposite direction, i.e. from the heat regulation circuit to the retarder and precisely to the exchanger 11.

In the case of this figure, corresponding to the hot state of the engine and so to the position of valve 9 bringing into circuit radiator 7, the electromagnetic valve 12 is also automatically energized, but it is no longer energized following energization of the retarder: this energization of the electromagnetic valve 12 is here due to the overshooting of the threshold temperature T (more especially of the order of 85° C.), by the liquid flowing in radiator 7, the thermocontact 18 being adapted precisely so as to ensure said control as soon as there is overshooting of said threshold, irrespective of the position of lever 14.

Therefore the heat generated by the engine 1 is discharged not only by radiator 7 but also by the fan which forms the rotor of the retarder, at the level of exchanger 11: this exchanger is then of course formed so as to make possible such cooling by ventilation, which is especially effective when the retarder is not itself generating heat and so is not energized.

Since the cooling power due to this latter fan is permanently available and cannot therefore be reduced and since in addition it is added to that due to the radiator, it is possible that a cumulated cooling power be reached, in the case of the figure examined, greater than the needs: advantage may be taken of this fact by reducing the share in the cooling due to radiator 7, the only condition to be fulfilled being that the cumulated cooling power remain sufficient to ensure the desired cooling.

This reduction of the cooling power of the radiator is more especially obtained:

a. either by reducing the dimensions of this radiator with respect to those required, all other things being equal, when the fan of the retarder cannot be used in the way which has just been described, or
b. by substantially reducing the dimensions of fan 8, or else
c. by controlling the decoupling of this fan as long as the cumulated cooling power is superabundant, for example by slaving respectively the energization of electromagnetic valve 12 and said decoupling control to the reaching of two different temperatures $T_1$ and $T_2$ by the liquid flowing in the radiator, temperature $T_2$ being greater than $T_1$ but always less than the maximum value admitted in practice.

This latter formula allows fan 8 to be maintained decoupled and electromagnetic valve 12 to be energized as long as a portion of the cooling power due to the ventilation generated by the rotor of the retarder remains available: thus, this power is recovered, which would otherwise be lost, before consuming energy for driving fan 8.

Each of the three above recommended solutions for reducing the cooling power of the radiator results in an economy of energy, which forms an important advantage.

So that energization of electromagnetic valve 12 does not cause a volume of liquid to be brought into immediate circulation much colder than that flowing just before this energization in the regulation circuit considered, it may be advantageous to provide means for delaying this bringing into circulation until this volume has been sufficiently heated.

These means may be timing means or else, as shown schematically in FIG. 4, a thermocontact 19, 20 responsive to the temperature of the liquid contained in exchanger 11 and mounted so as to establish a connection between lever 14 and winding 13 only when said temperature exceeds a predetermined value, for example of 40° or 50° C.

Another improvement shown schematically by the push-button 21 in FIG. 4 allows the electromagnetic valve 12 to be energized from means other than the lever 14 and thermocontact 18: these other means could for example be a delay or thermosensitive circuit allowing heat from the retarder to be recovered for some time after the end of energization thereof.

Purely by way of illustration, it can be stated that the mean recovery rate of heat dissipated by the retarder may reach 30 to 40%. Such a recovery rate corresponds, for a town bus stopping three times per kilometer, to a mean recovered power of the order of 8 kW, which allows practically the heating needs of the passenger space of said bus to be satisfied as long as the outside temperature is not less than 5° C., and taking into account the fact that the two doors of said passenger space are wide open once every minute for about 10 seconds.

Following which and whatever the embodiment adopted, a vehicle heat regulation circuit is obtained whose construction, operation and advantages (particularly the recovery of energy which it makes possible) follow sufficiently from what has gone before.

As is evident, and as it follows moreover already from what has gone before, the invention is in no wise limited to those of its modes of application and embodiments which have been more especially considered: it embraces, on the contrary, all variations thereof, particularly those where the portion of circuit 4 across which the second section 15 is mounted in parallel still comprises the internal section 5 of the engine but not pump 6.

We claim:

1. A closed liquid circuit system for the heat regulation of a vehicle having an internal combustion engine and an electrical retarder, the closed circuit having first and second circuit sections, said first circuit section including said internal combustion engine, a radiator, and a circulating pump for circulating liquid through said closed circuit, said second circuit section including a retarder heat exchanger, valve means disposed between said first and second circuit sections for controlling the flow of liquid through said closed liquid circuit, said retarder having means for generating a ventilation air flow through the retarder and in heat exchange relation with the heat exchanger for transmitting heat from said electrical retarder to said heat exchanger when said electrical retarder is energized and for cooling said heat exchanger by said ventilation air flow when said electrical retarder is not energized, whereby said ventilation air flow from said electrical retarder is useful for both heating and cooling liquid in said retarder heat exchanger.

2. A system according to claim 1, wherein the heat exchanger is formed by a hollow metal body, the interior of which forms part of the liquid circuit system, and over the outside of which passes the ventilation air flow produced by said electrical retarder.

3. A system according to claim 2, wherein the hollow metal body of said heat exchanger is mounted at the outlet of a casing surrounding the retarder.

4. A system according to claim 1, wherein the heat exchanger is formed by the stator of the electrical retarder which is hollowed for allowing flow of the liquid therethrough.

5. A system according to claim 1, further comprising a further circuit section in parallel with the portion of the circuit which includes the engine and pump, said further circuit section including a second heat exchanger for heating the passenger space of the vehicle and valve for controlling liquid flow through said second heat exchanger.

6. A system according to claim 1 wherein said valve means includes an electromagnetically operated valve, and first means operatively associated with said electrical retarder for controlling said valve for causing liquid flow through said retarder heat exchanger when said electrical retarder is energized and liquid is prevented from flowing through said heat exchanger when said electrical retarder is not energized.

7. A system according to claim 6 further including a thermostatic switch operatively associated with said electromagnetically operated valve, said thermostatic switch being responsive to the temperature of liquid circulated through said circulating pump and said internal combustion engine and being adapted to override said first means for controlling said valve to allow liquid flow through said heat exchanger, independent of the energization or non-energization of said electrical retarder, whenever said temperature of said liquid circulated through said circulating pump and said internal combustion engine exceeds a predetermined threshold temperature.

8. A system according to claim 7 wherein said radiator includes a fan operatively associated therewith for cooling said radiator, and said liquid flowing through said heat exchanger when said electrical retarder is not energized is cooled by said air ventilation flow from said electrical retarder to thereby reduce the heat dissipation capacity required to be given by said radiator and said associated fan for cooling the liquid in said system.

9. A system according to claim 1 including means responsive to the temperature of liquid in said heat exchanger for controlling said valve means to prevent liquid flow through said heat exchanger when the temperature of the liquid therein is less than a predetermined threshold value.

10. A system according to claim 1 further including means for selectively switching said radiator into and out of liquid flow relationship with said engine and said circulating pump.

* * * * *